(12) United States Patent
Galor Gluskin et al.

(10) Patent No.: US 10,410,368 B1
(45) Date of Patent: Sep. 10, 2019

(54) HYBRID DEPTH PROCESSING

(71) Applicant: QUALCOMM Incorporated, San Diego, CA (US)

(72) Inventors: Micha Galor Gluskin, San Diego, CA (US); Lee-Kang Liu, San Diego, CA (US); Jisoo Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/144,038

(22) Filed: Sep. 27, 2018

(51) Int. Cl.
| | |
|---|---|
| *H04N 13/204* | (2018.01) |
| *G06T 7/593* | (2017.01) |
| *G06N 3/08* | (2006.01) |
| *H04N 5/247* | (2006.01) |

(52) U.S. Cl.
CPC ............... *G06T 7/593* (2017.01); *G06N 3/08* (2013.01); *H04N 5/247* (2013.01); *H04N 13/204* (2018.05); *G06T 2207/10012* (2013.01); *G06T 2207/20224* (2013.01)

(58) Field of Classification Search
CPC ........... G06T 7/593; G06T 2207/10017; G06T 2207/20224; H04N 5/247; H04N 13/204; G06N 3/08
USPC .......................................................... 348/47
See application file for complete search history.

(56) References Cited

U.S. PATENT DOCUMENTS

| | | | |
|---|---|---|---|
| 7,751,700 B2 * | 7/2010 | Kusaka | G03B 13/28 348/345 |
| 9,235,899 B1 | 1/2016 | Kirmani et al. | |
| 9,554,115 B2 | 1/2017 | Agranov et al. | |
| 9,835,773 B2 | 12/2017 | Zhang et al. | |
| 9,848,118 B2 | 12/2017 | Ollila et al. | |
| 2011/0013061 A1 * | 1/2011 | Hoda | G02B 7/34 348/294 |
| 2011/0273599 A1 * | 11/2011 | Murata | G02B 7/36 348/294 |
| 2015/0098005 A1 * | 4/2015 | Tsai | H04N 5/23212 348/336 |
| 2016/0240570 A1 * | 8/2016 | Barna | H01L 27/14605 |
| 2016/0337601 A1 | 11/2016 | Lee et al. | |
| 2018/0176452 A1 * | 6/2018 | Nikkanen | H04N 5/23212 |
| 2019/0057495 A1 * | 2/2019 | Shionoya | H04N 5/232 |

* cited by examiner

*Primary Examiner* — Michael Lee
(74) *Attorney, Agent, or Firm* — Paradice and Li LLP

(57) ABSTRACT

Aspects of the present disclosure relate to systems and methods for hybrid depth map processing. An example device may include a first sensor having a plurality of focus pixels, the focus pixels configured to capture images from at least a first perspective and a second perspective, where a difference between the first and second perspectives is associated with a first direction. The device may further include a second image sensor separated from the first image sensor in a second direction orthogonal to the first direction. The device may be configured to receive a first image from the first image sensor, where the first image includes first image data captured from the first perspective, and second image data captured from the second perspective. The device may be further configured to receive a second image from the second image sensor, and to generate a hybrid depth map based at least in part on the first image and the second image.

30 Claims, 7 Drawing Sheets

HYBRID DEPTH PROCESSING

TECHNICAL FIELD

This disclosure relates generally to systems and methods for processing images, and more particularly to processing images captured by multiple camera devices having image sensors capable of capturing image data from two or more perspectives, for example using a plurality of focus pixels.

BACKGROUND

Image sensors may be capable of generating images captured from two or more perspectives. For example, such image sensors may include a plurality of focus pixels capable of capturing image data from two or more perspectives. As one example, a dual photodiode (2PD) image sensor may include a number of 2PD pixels, where each 2PD pixel includes two adjacent photodiodes, and each photodiode of a 2PD pixel captures image data from a different perspective. For example, a first photodiode and a second photodiode of a 2PD pixel may be a left photodiode and a right photodiode that capture image from a respective left perspective and a right perspective. Values or measurements for the image data provided by such focus pixels may include a luminance or brightness (intensity) measurement from the first perspective and a luminance or brightness measurement from the second perspective. For autofocus (AF) operations or depth related operations (such as depth sensing, depth mapping, real-time bokeh effects, etc.), the difference in measurements between the perspectives of the focus pixels (along with the difference in the two perspectives) of the image sensor's pixels may be used in determining a phase difference or value used in determining an object depth.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for hybrid depth map processing. In one example implementation, a is disclosed. The example device may a first image sensor including a plurality of focus pixels, the focus pixels configured to capture images from at least a first perspective and a second perspective, a difference between the first and second perspectives associated with a first direction, a second image sensor separated from the first image sensor in a second direction orthogonal to the first direction, a memory, and a processor coupled to the memory. The processor is configured to receive a first image from the first image sensor, wherein the first image includes first image data captured from the first perspective and second image data captured from the second perspective, receive a second image from the second image sensor, and generate a hybrid depth map based at least in part on the first image and the second image.

In another example, a method for hybrid depth map processing is disclosed. The example method may include receiving a first image from a first image sensor, the first image sensor associated with a first direction, receiving a second image from a second image sensor, the second image sensor separated from the first image sensor in a second direction orthogonal to the first direction, determining a first depth map based on the first image, determining a second depth map based on a disparity between respective pixels of the first image and the second image, and generating a hybrid depth map based at least in part on the first depth map and the second depth map.

In another example, a non-transitory computer-readable medium is disclosed. The non-transitory computer-readable medium may store instructions that, when executed by a processor, cause an image processing device to receive a first image from a first image sensor, the first image sensor associated with a first direction, receive a second image using a second image sensor, the second image sensor separated from the first image sensor in a second direction orthogonal to the first direction, determine a first depth map based on the first image, determine a second depth map based on a disparity between respective pixels of the first image and the second image, and generate a hybrid depth map based at least in part on the first depth map and the second depth map.

In another example, an image processing device is disclosed. The device includes means for receiving a first image from a first image sensor, the first image sensor associated with a first direction, means for receiving a second image from a second image sensor, the second image sensor separated from the first image sensor in a second direction orthogonal to the first direction, means for determining a first depth map based on the first image, means for determining a second depth map based on a disparity between respective pixels of the first image and the second image, and means for generating a hybrid depth map based at least in part on the first depth map and the second depth map.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Figure 1:
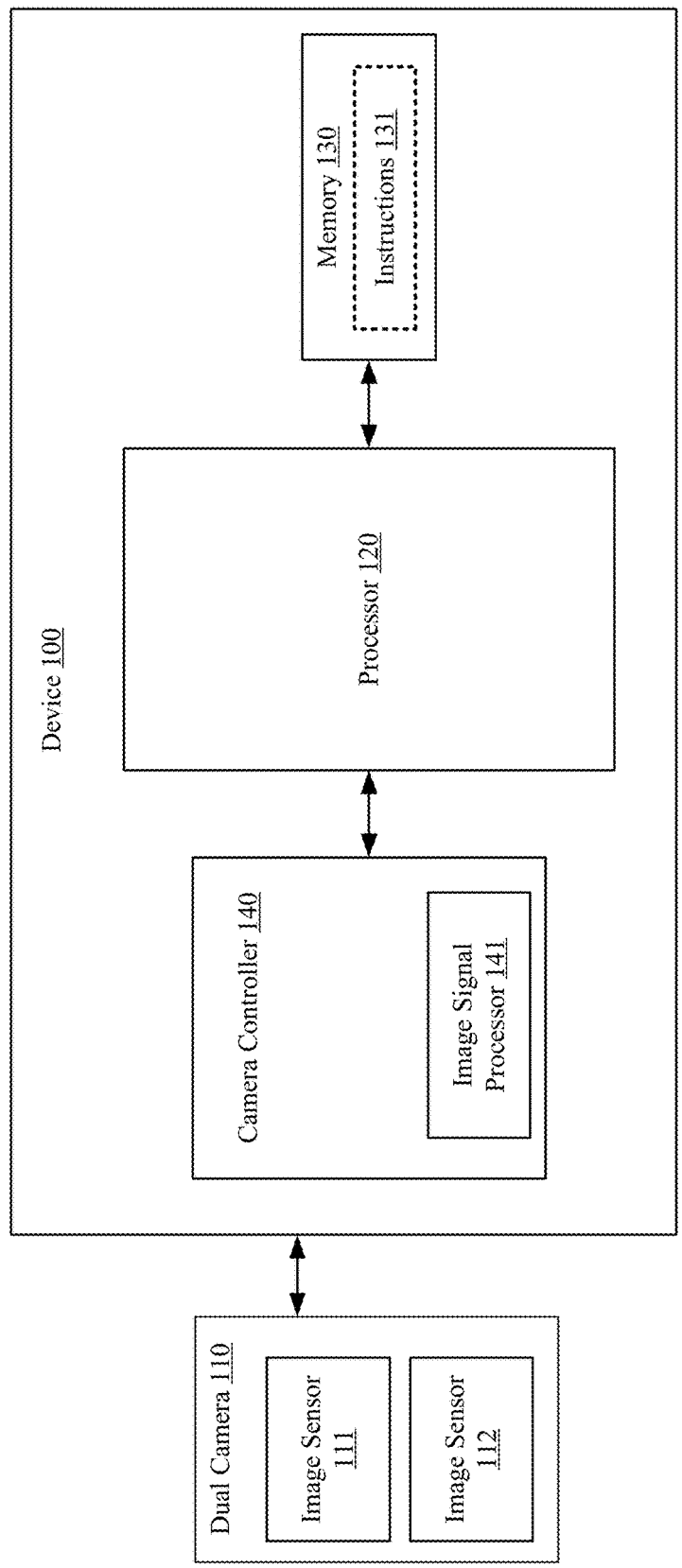
FIG. 1 is a block diagram of an example image processing device, according to some example implementations.

Aspects of the present disclosure may be used for improving image processing operations. Some cameras may include one or more image sensors which may capture image data from two or more perspectives, such as a first perspective and a second perspective. For example, the two perspectives may be adjacent in a horizontal direction, such that the first perspective is a left perspective, and the second perspective is a right perspective. Such image sensors may capture image data from the two or more perspectives using a number of focus pixels. The focus pixels may include one or more pixels including multiple photodiodes, such as dual photodiode (2PD) pixels, where each 2PD pixel includes a first photodiode and an adjacent second photodiode. Further, the focus pixels may include one or more pixels which have been directionally masked to limit the perspective from which image data is captured, such as masking a left side of some focus pixels, and a right side of some other focus pixels (such focus pixels may be called "directionally masked" pixels). Further, the focus pixels may include pixels having an on-chip lens (OCL) such as a micro-lens, which may limit the perspective from which each focus pixel may capture image data. Thus, a first image sensor may include first focus pixels which may measure a brightness from the first perspective, and second focus pixels may measure a brightness from the second perspective. The first image sensor may capture first image data from a first perspective. The first image data includes measurements from the first focus pixels in the first image sensor. The first image sensor also may capture second image data from a second perspective. The second image data includes measurements from the second focus pixels in the first image sensor.

The captured image data from different perspectives may be used for depth related image processing functions, such as phase detection autofocus (PDAF), real-time bokeh effects, and so on. A depth map may be generated from the captured image data from different perspectives. The depth map may include estimates of distances of objects from the first image sensor. The distances may be based on the disparity between measurements by the first focus pixels and the second focus pixels. Such disparities may correspond to the difference in perspective between the measurements from the first focus pixels and those from the second focus pixels. In some implementations a sum of absolute differences (SAD) metric may be used for determining the disparity.

However, depth maps determined using such a first image sensor may not accurately determine depths for some types of captured images. For example, when the first and second focus pixels capture image data from a left perspective and a right perspective, depths may not be accurately determined when the left focus pixels capture similar data to the right focus pixels. For example, consider a straight, horizontal object such as a roof of a building-such an object may appear very similar to both the left and right focus pixels, and this similarity of the image captured by the left focus pixels and the image captured by the right focus pixels may result in inaccurate measurement of the disparity between the left perspective and the right perspective. Because images of such objects may appear similar from a range of horizontal shifts, or potential disparities, determining which shift corresponds to the actual disparity—and thus to the actual depth of the object—may be difficult. Such regions may be said to lack horizontal edges.

In some example implementations, a second image sensor may capture images in addition to the first image sensor capturing images. The second image sensor may be separated from the first image sensor by a distance and in a direction orthogonal to the direction of the difference between the two perspectives of the focus pixels of the first image sensor. For example, if the first image sensor captures image data from a left perspective and a right perspective, then the second image sensor may be separated in a vertical direction. A disparity between images captured by the first image sensor and by the second image sensor may be used to determine a second depth map. The second depth map may be used to more accurately determine depths for regions lacking horizontal edges. In some example implementations, a hybrid depth may be determined based on the first depth map generated exclusively using the first image sensor and the second depth map generated using the first image sensor and the second image sensor. For example, the first image sensor may determine depths more accurately for regions including horizontal edges, while the disparity between the first image sensor and the second image sensor may determine depths more accurately for regions including vertical edges. These and other details of the example implementations, which provide one or more technical solutions to the aforementioned problems, are described in more detail below.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable image processing device (such as cameras, smartphones, tablets, laptop computers, or other devices) which process images from two or more image sensors, one or more of which includes a number of focus pixels, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates and may have movable or static components. While the below description and examples use the term "system" to describe various aspects of this disclosure, the term "system" is not limited to a specific configuration, type, or number of objects.

As noted above, image sensors may capture images including image data from two or more perspectives. For example, such image sensors may include a plurality of focus pixels for capturing image data from the two or more perspectives. Such focus pixels may be provided as directionally masked pixels, using an on-chip lens such as a micro-lens, or as 2PD pixels including two photodiodes (a first photodiode and a second photodiode). In some examples, the two perspectives may be a left perspective and a right perspective. A first phase image may be determined using image data captured from the first perspective. For example, the focus pixels configured to capture image data from the left perspective may be used in determining the first phase image. A second phase image may be determined using image data captured from the second perspective. For example, the focus pixels configured to capture image data from the right perspective may be used in determining the second phase image.

The different perspectives between the first phase image and the second phase image may result in a disparity between the two phase images. The disparity may be determined and used for depth related image processing operations, such as for generating depth maps, for phase detection autofocus (PDAF) operations, and so on. However, as discussed above, it may be difficult for the disparity to be accurately determined for scenes lacking some types of edges. For example, if a first image sensor includes focus pixels capturing image data from a left perspective and a right perspective, horizontal edges in the scene may be straightforward to detect from the disparity between the two perspectives, but regions of the scene lacking horizontal edges may be difficult to detect. For example, in a region of a scene lacking horizontal edges, such as a region including a horizontal roofline of a building, or the horizontal top of a person's hair, left images captured by the left focus pixels and right images captured by the right focus pixels may be similar for a range of horizontal shifts. Thus, it may be difficult to accurately determining which of the horizontal shifts best corresponds to the actual disparity between the left images and right images. More generally, such an image sensor may have difficulty determining depths for regions lacking edges which correspond to the direction of the difference between the two perspectives of the focus pixels. It would therefore be desirable to enhance detection of depths for regions lacking edges corresponding to the direction of the difference in two perspectives of the focus pixels of an image sensor.

Some example implementations may allow for enhanced depth detection by leveraging the location of a second image sensor relative to a first image sensor. The first image sensor may be capable of capturing images with image data from multiple perspectives. For example, the first image sensor may capture images from at least a first perspective and a second perspective, where a difference between the first perspective and the second perspective is associated with a first direction. The second image sensor may be separated from the first image sensor in a direction orthogonal to the first direction. For example, the first image sensor may be an image sensor including focus pixels which may capture image data from at least a left perspective and a right perspective. Thus, the difference between the left perspective and the right perspective is associated with a horizontal direction. The second image sensor may then be separated from the first image sensor in a vertical direction. For example, the second image sensor may be located at a distance above or below the first image sensor.

A first disparity between the image data from the different perspectives for a captured image from the first image sensor may be used to determine depths for regions of a scene including edges corresponding to the first direction. A second disparity between the images captured by the first image sensor and by the second image sensor may be used to determine depths for regions of the scene including edges corresponding to the second direction. For example, if the first direction is a horizontal direction, and the first image sensor and the second image sensor are separated in a vertical direction, the first disparity may be used to determine depths corresponding to horizontal edges, and the second disparity may be used to determine depths corresponding to vertical edges.

FIG. 1 is a block diagram of an example device 100, which may be used with the example implementations. In some implementations, the device 100 may include or be coupled to a dual camera module 110, a processor 120, a memory 130 storing instructions 131, and a camera controller 140. The device 100 may optionally include or be coupled to a display, one or more input/output (I/O) components, a power supply, or a network interface, which may include a number of transceivers and a baseband processor (not shown for simplicity). The device 100 may additionally include or be coupled to additional cameras other than the dual camera module 110.

The dual camera module 110 may be capable of capturing individual image frames (such as still images) and/or capturing video (such as a succession of captured image frames). The dual camera module 110 may include a first image sensor 111 and a second image sensor 112. The first image sensor 111 may be incorporated in a first camera of the dual camera module 110, while the second image sensor 112 may be incorporated in a second camera of the dual camera module 110 (not shown for simplicity). The dual camera module 110 may include additional image sensors. The first image sensor 111 may be an image sensor including a plurality of focus pixels, configured to capture images using information from two or more perspectives. The difference between two of the perspectives may be associated with a first direction. The second image sensor 112 may also be configured to capture images using information from two or more perspectives. The second image sensor 112 may be separated from the first image sensor 111 in a second direction orthogonal to the first direction. In some implementations, the first image sensor 111 may be configured to capture wide angle images, and the second image sensor 112 may be configured to capture telephoto images. Note that while the dual camera module 110 is described as a dual camera module, in some implementations, the first image sensor 111 and the second image sensor 112 may be located within separate cameras coupled to or incorporated within the device 100.

The memory 130 may be a non-transient or non-transitory computer-readable medium storing computer-executable instructions 131 to perform all or a portion of one or more operations described in this disclosure.

The processor 120 may be one or more suitable processors capable of executing scripts or instructions of one or more software programs (such as instructions 131) stored within the memory 130. In some aspects, the processor 120 may be one or more general-purpose processors that execute instructions 131 to cause the device 100 to perform any number of functions or operations. In additional or alternative aspects, the processor 120 may include integrated circuits or other hardware to perform functions or operations without the use of software. While shown to be coupled to each other via the processor 120 in the example device 100, the processor 120, the memory 130, and the camera controller 140 may be coupled to one another in various arrangements. For example, the processor 120, the memory 130, and the camera controller 140 may be coupled to each other via one or more local buses (not shown for simplicity).

The camera controller 140 may include an image signal processor (ISP) 141, which may be one or more image signal processors to process captured image frames or video provided by the dual camera module 110. The ISP 141 may be configured to process images, such as images captured by the first image sensor 111 and the second image sensor 112. In some example implementations, the camera controller 140 may also control operations of the dual camera module 110 in capturing images using the first image sensor 111 and the second image sensor 112.

In some aspects, the ISP 141 may execute instructions from a memory (such as instructions 131 of memory 130 or instructions stored in a separate memory included in or coupled to the ISP 141) to process image frames or video captured by the dual camera module 110 and/or control the dual camera module 110. In some other aspects, the ISP 141 may include specific hardware to process image frames or video captured by the dual camera module 110 and/or control the dual camera module 110. The ISP 141 may alternatively or additionally include a combination of specific hardware and the ability to execute software instructions to process image frames or video captured by the dual camera module 110 and/or control the dual camera module 110.

In the following examples, the device 100 is described as performing one or more of the described processes. However, any suitable device may be used, and the device 100 is used for illustrative purposes only, and the present disclosure should therefore not be limited to a specific device. The device 100 may include any number of cameras/image sensors. For example, the device 100 may include a dual camera module, or the device 100 may include no cameras or image sensors. In the latter example, the device 100 may receive the images to be processed from a remote source.

Figure 2:
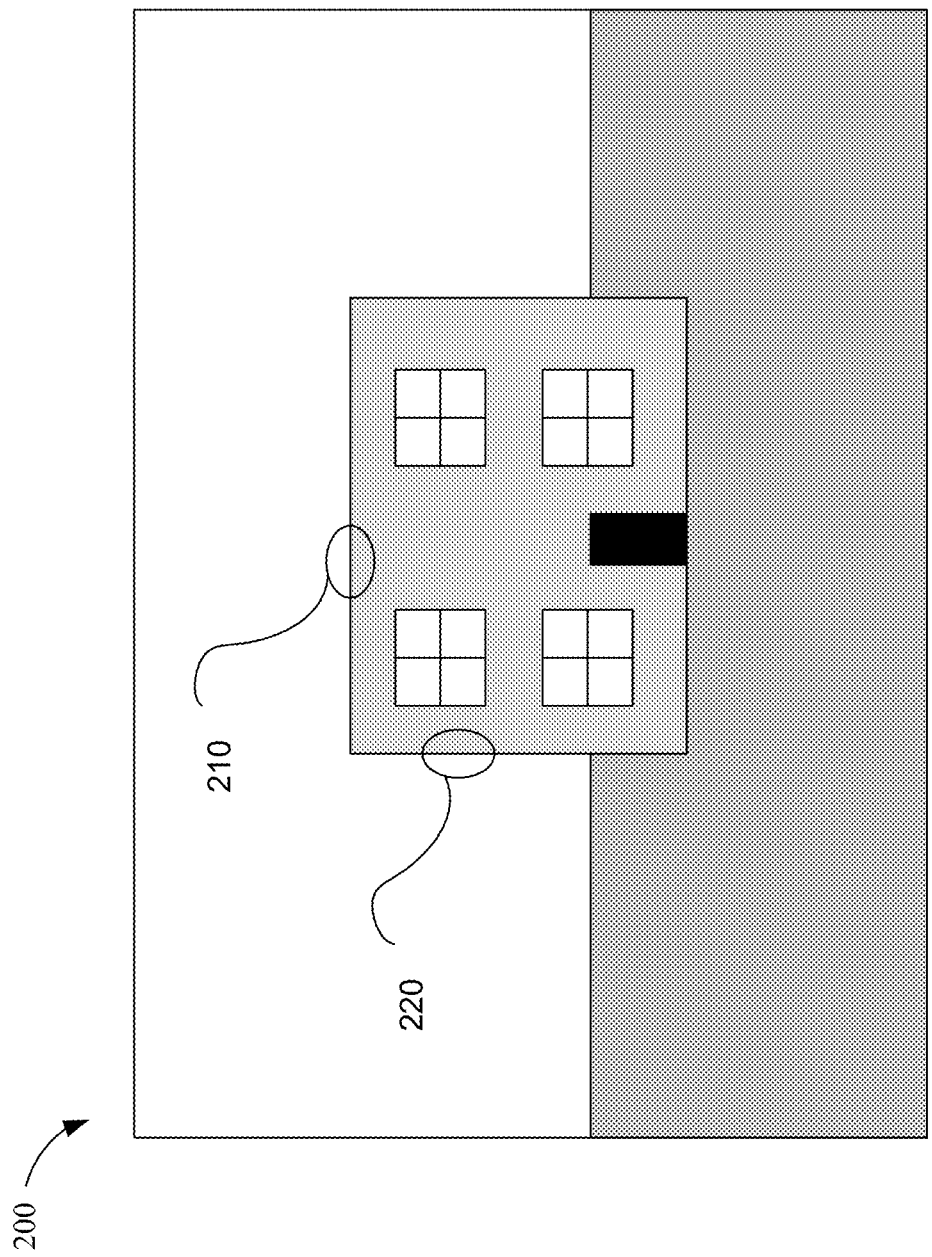
FIG. 2 depicts an example scene which may be captured according to some example implementations.

FIG. 2 shows an example scene 200 including regions lacking horizontal edges and regions lacking vertical edges. As discussed above, some image sensors may not be able to accurately determine depths for regions of a scene lacking horizontal edges. Region 210 of FIG. 2, showing a horizontal portion of a roofline of a building, is an example of such a region lacking horizontal edges, and instead containing mainly vertical edges. For an image sensor configured to capture image data from a left perspective and a right perspective, depths for the region 210 may be difficult to accurately determine. As discussed above, this is because the image data from the left perspective appears very similar to image data from the right perspective for a range of horizontal shifts. Similarly, some other image sensors may not be able to accurately determine depths for regions of a scene lacking vertical edges. Region 220 of FIG. 2, showing a vertical portion of a wall of a building, is an example of such a region lacking vertical edges, and instead containing mainly horizontal edges. For an image sensor configured to capture image data from an upper perspective and a lower perspective, depths for the region 220 may be difficult to accurately determine. This may be because the image data for the upper perspective appears very similar to image data from the lower perspective for a range of vertical shifts.

Figure 3:
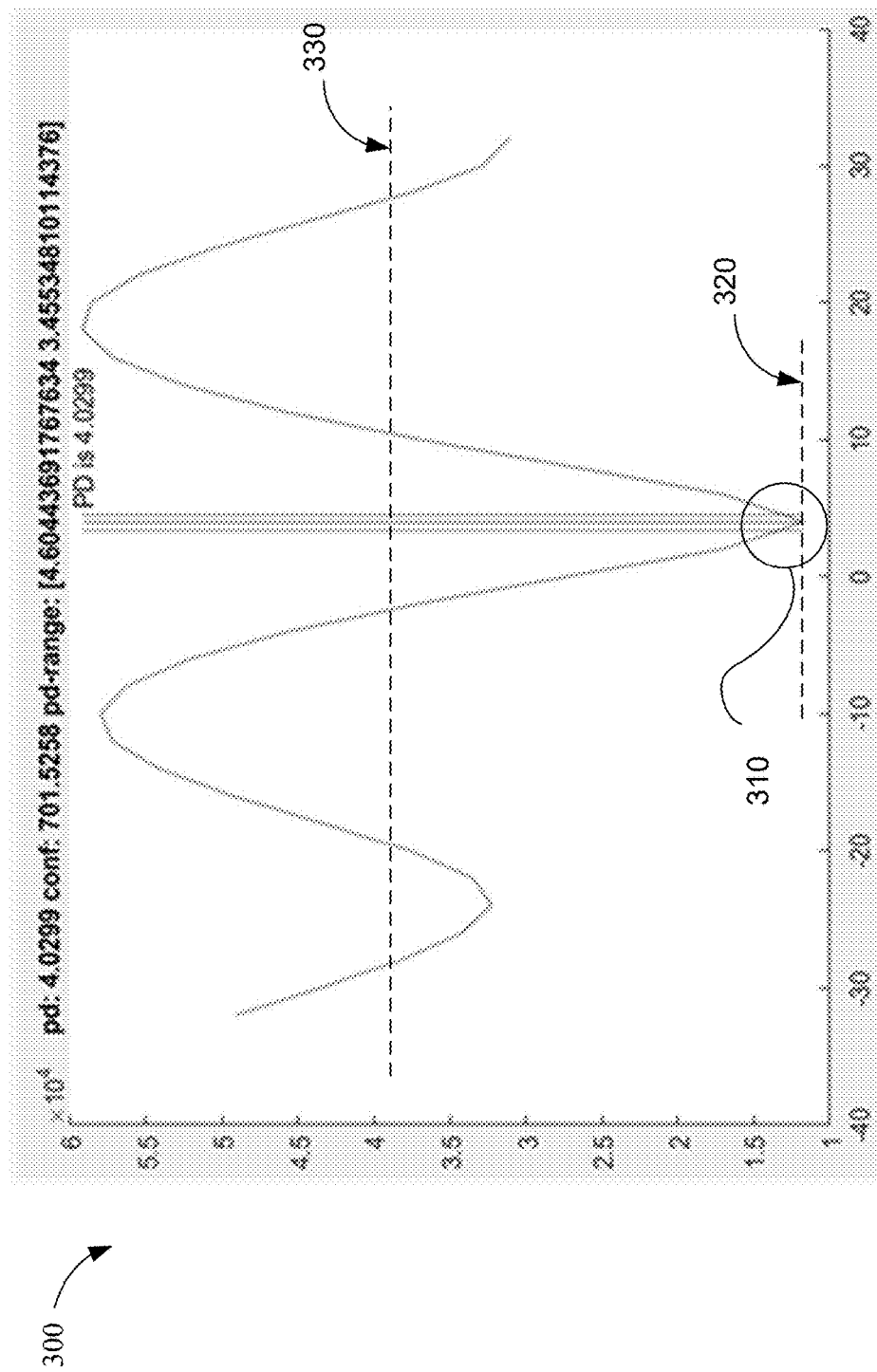
FIG. 3 depicts an example plot of a sum of absolute differences (SAD) metric for a portion of an image captured using an example image sensor.

FIG. 3 depicts a plot 300 of an example SAD metric for the phase image, with the SAD plotted (on the y-axis) versus the phase difference (on the x-axis). The SAD metric may represent a sum of absolute differences between the phase image and another phase image corresponding to the same scene but from a different perspective. For example, the SAD metric may represent a sum of absolute differences between image data from a first set of focus pixels of an image sensor, corresponding to a first perspective, and image data from a second set of focus pixels of the image sensor, corresponding to a second perspective. The phase difference (on the x-axis) may correspond to a candidate distance to objects in the scene, and thus determining the distance to objects in the scene corresponds to determining the phase difference at which the SAD is minimized. The phase difference may also be described as a shift of one phase image relative to the other phase image. For example, if the first and second perspectives are left and right perspectives, the phase difference on the x-axis may correspond to a horizontal shift, with the SAD metric at each horizontal shift shown on the y axis.

The phase difference corresponding to the smallest SAD ("minimum phase difference") thus corresponds to a best estimate of the distance to or depth of objects in the scene captured in the two phase images. More particularly, the minimum phase difference corresponds to the estimated disparity between the two phase images, which, in combination with the known configuration of the image sensor, specifies the estimated depth. With respect to FIG. 3, the minimum value of the SAD in the plot 300 is depicted at 310 and occurs at a phase difference of just over 4. The minimum phase difference for the plot 300 in FIG. 3 is shown as "PD" approximately equaling 4.0299. The minimum phase difference may be used for a variety of image processing operations. For example, the minimum phase difference may be used to determine a focal length during PDAF. Similarly, the minimum phase difference may correspond to a plane of focus for image processing operations incorporating depth maps or depth sensing, such as real time bokeh effects.

In addition to being used in determining the minimum phase difference, the SAD metric may be used to determine a confidence value in the determined minimum phase difference. A variety of techniques may be used for determining the confidence values. In some example implementations, local properties of the SAD metric near the determined minimum phase difference may be used to determine the confidence values. In one example, a determined minimum SAD from a SAD metric with large slopes near the minimum (thus producing a distinct minimum) may have a higher confidence value than a determined minimum SAD from a SAD metric with shallower slopes near the minimum. In one example, the confidence value may correspond to a ratio between the average value of the SAD metric over a range of phase differences and the determined minimum value of the SAD metric. Thus, the smaller the minimum value of the SAD metric relative to the average value, the more distinct the minimum, and the higher the confidence value. With respect to FIG. 3, such a confidence value may correspond to a ratio between average SAD value 330 and minimum SAD value 320.

In some example implementations, a SAD metric, a minimum phase difference and a confidence value may be determined for each tile of an image, where the image is segmented into a plurality of tiles. In some example implementations, a confidence value and an estimated depth may be determined for each pixel of the image. For example, each pixel in a tile may be associated with the estimated depth (corresponding to the determined minimum phase difference) and confidence value for the determined minimum phase difference for the tile. The set of confidence values including a confidence value determined for each pixel (such as for each tile) in the image may collectively be referred to as a confidence map. The confidence map may be called a per-pixel confidence map for confidence values determined for each pixel. The confidence map may be called a per-tile confidence map for confidence values determined for each tile.

Note that the tiles may be of any suitable size. In one example, the image may be considered as a single tile, and the per-tile confidence map may therefore include a single confidence value for the image. In other implementations the image may be considered as a plurality of tiles, and the per-tile confidence map may include a confidence value for each tile of the plurality of tiles. The tiles may for example, be of equal size, and may be square or rectangular. In some implementations the tiles may be non-overlapping, such that each pixel of an image is a part of only one tile. In some other implementations some tiles may overlap, such that some pixels may be a part of more than one tile.

As mentioned above, edges in a captured scene in a specific orientation relative to the image sensor may be difficult to detect from the disparities between the phase images of the image sensor. These problems may arise depending on the orientation of the disparities respective to the orientation of the focus pixels of the image sensor.

Figure 4:
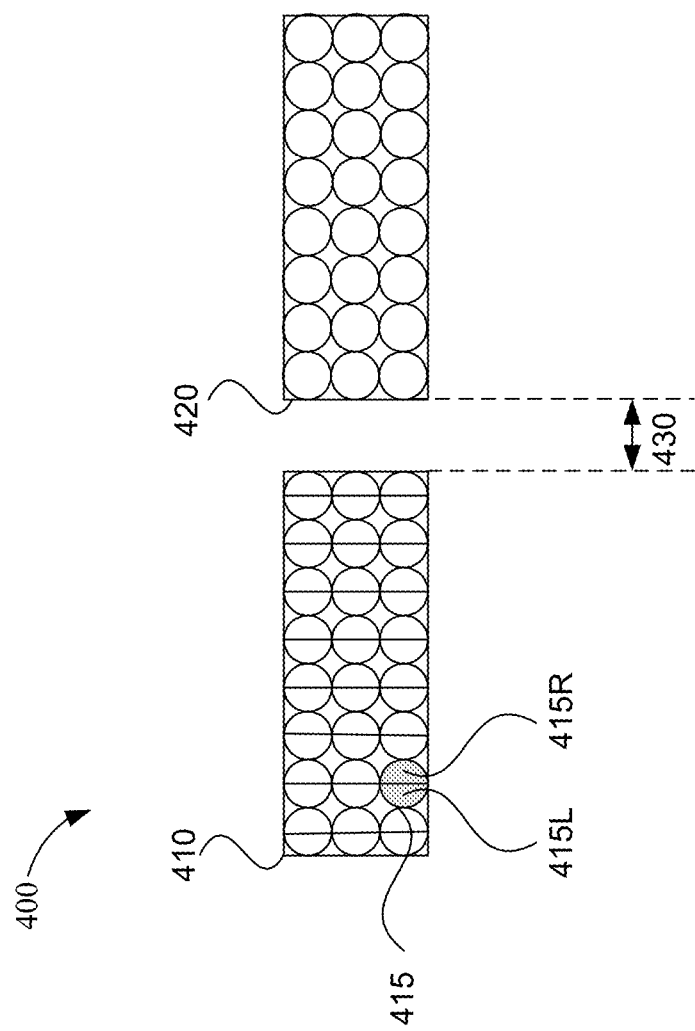
FIG. 4 depicts a conventional image sensor configuration.

FIG. 4 shows a conventional image sensor configuration 400. For example, the image sensor configuration 400 may be for a dual camera module incorporated in or coupled to an image processing device. The image sensor configuration 400 may include a first image sensor 410 and a second image sensor 420 oriented such that the longer edge of the first image sensor 410 is parallel with the longer edge of the second image sensor 420. In other words, when capturing an image of a scene in a "landscape" orientation (as opposed to a "portrait" orientation), the first image sensor 410 is located in a horizontal direction from the second image sensor 420. For example, the second image sensor 420 may be described as separated from the first image sensor 310 in a horizontal direction by a separation distance 430. The first image sensor 410 may include a plurality of focus pixels. For example, the focus pixels may include a plurality of 2PD pixels, such as a 2PD pixel 415 which is determined using a left photodiode 415L and a right photodiode 415R. Note that while first image sensor 410 is shown as a 2PD image sensor, the first image sensor may also be one of a variety of image sensors including focus pixels configured to capture images from two or more perspectives associated with the first direction. Note further that while each pixel in the first image sensor 410 is shown as a focus pixel, the focus pixels may also be sparse, such that only a subset of the pixels of the image sensor are focus pixels. Additionally, note that while the second image sensor 420 is not depicted as including focus pixels, that the second image sensor may also include focus pixels. As discussed above, determining depths for scenes lacking vertical edges may be difficult using the conventional image sensor configuration 400 when separation distance 430 is in a horizontal direction. For example, the measurement from the left photodiode 415L may be similar to the measurement from the corresponding right photodiode 415R for a range of horizontal shifts if the scene captured by the first image sensor 410 lacks horizontal edges.

Figure 5:
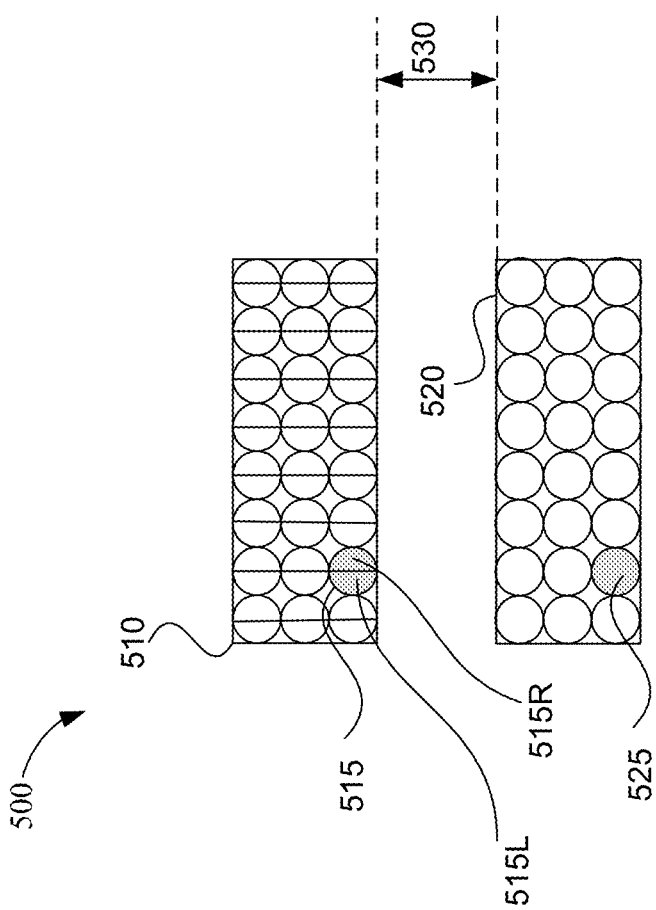
FIG. 5 depicts an image sensor configuration, according to some example implementations.

FIG. 5 shows an example image sensor configuration 500, in accordance with some example implementations. For example, the image sensor configuration 500 may be for a dual camera module incorporated in or coupled to an image processing device, such as device 100. As discussed above, conventional image sensor configurations may fail to accurately detect depths in scenes lacking edges corresponding with the direction of the difference between two perspectives of the focus pixels of the first image sensor. For example, the first image sensor 510 may include a plurality of focus pixels. In one example, the first image sensor 510 may be a 2PD image sensor having focus pixels in the form of 2PD pixels. For example, the first image sensor 510 may include left and right photodiodes for each focus pixel, such as left photodiode 515L and right photodiode 515R of focus pixel 515. Thus, the difference between the perspectives of the focus pixels of the first image sensor 510 may be associated with a horizontal direction. Consequently, the first image sensor 510 may have difficulty detecting depths in scenes lacking horizontal edges. Example implementations may improve depth detection in such scenes by providing the second image sensor 520 at a distance 530 from the first image sensor 510 in a direction orthogonal to the direction in which the left and right photodiodes are separated in the first image sensor 510. Thus, while the difference between the perspectives of the focus pixels of the first image sensor 510 may be associated with a horizontal direction, the second image sensor 520 may be separated by the distance 530 from the first image sensor 510 in a vertical direction. This may allow for disparities from scenes lacking horizontal edges to be better detected by comparing pixels captured from the first image sensor 510 with corresponding pixels captured from the second image sensor 520. For example, in addition to determining a disparity based on image data captured by left photodiode 515L and right photodiode 515R, disparities may further be determined based on comparing corresponding pixels of the images captured by first image sensor 510 with respective pixels of the images captured by the second image sensor 520. For example, disparities may be determined between the image data captured in focus pixel 515 and pixel 525. In another example, disparities may be determined between corresponding regions of the images captured by first image sensor 510 and second image sensor 520, for example when the first image sensor 510 and the second image sensor 520 capture images having different resolutions. Note that for some implementations, images captured by focus pixel 515 may refer to image data from the left photodiode 515L, or the right photodiode 515R. Thus, a hybrid depth map may be determined which can not only detect depths in regions lacking horizontal edges, but also in regions lacking vertical edges—for example, in regions such as region 210 and also in regions such as region 220 of FIG. 2—as compared with conventional image sensor configurations.

Note that while the second image sensor 520 is shown as being located a vertical distance 530 below the first image sensor 510 in FIG. 4, the second image sensor 520 may be located above the first image sensor 510. Additionally, while the photodiodes of the focus pixels of the first image sensor 510 are shown adjacent in a horizontal direction, in some other example implementations the photodiodes of the focus pixels of the first image sensor may be adjacent vertically or in another direction. If the photodiodes are adjacent in a vertical direction, the second image sensor may be separated from the first image sensor in a horizontal direction. Similarly, if the photodiodes of the focus pixels of the first image sensor are adjacent in another direction, the second image sensor may be separated from the first image sensor in a direction orthogonal to that direction.

Further, while each of the pixels of the first image sensor 510 are shown to be focus pixels, in other implementations, only a portion of the pixels of the first image sensor may be focus pixels—that is, the focus pixels may be sparsely distributed on the first image sensor. Similarly, while the pixels of the second image sensor 520 are shown not to be focus pixels, in other implementations the second image sensor may also have focus pixels, which may for example be determined using two photodiodes, such as left and right photodiodes, or up and down photodiodes. In some example implementations, the first image sensor 510 may be a wide angle image sensor, and the second image sensor 520 may be a telephoto image sensor. In one example, the wide angle image sensor includes focus pixels, and the telephoto image sensor is not.

While the focus pixels of the image sensors in configuration 500 are depicted as 2PD pixels, such depiction is for simplicity only. In other implementations, as discussed above, the focus pixels may include directionally masked pixels, pixels having an OCL such as a micro-lens, and so on. Thus, for example, instead of left and right photodiodes 515L and 515R capturing respective image data from left and right perspectives, in some other implementations, the focus pixels may include directionally masked pixels, or pixels having an OCL in order to capture the image data from the left and right perspectives.

Figure 6:
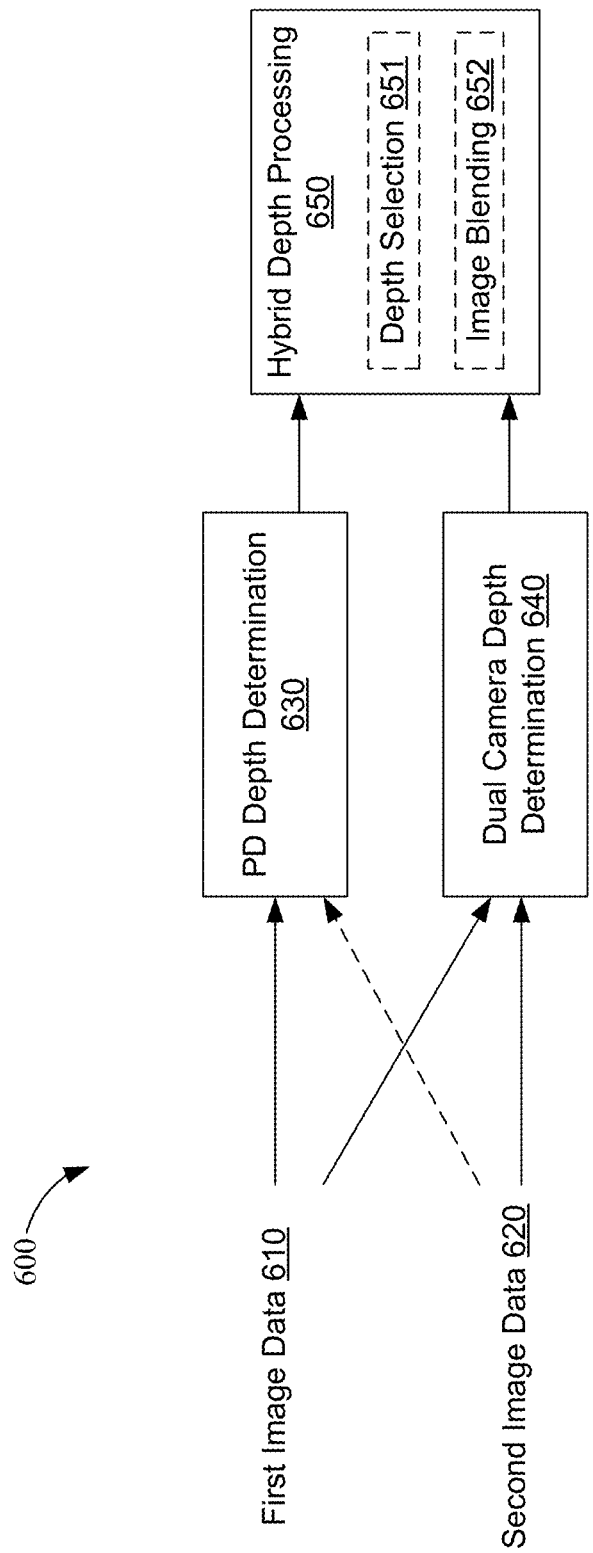
FIG. 6 shows an example system for generating hybrid depth maps, according to some example implementations.

FIG. 6 shows a block diagram of a system 600 for generating hybrid depth maps based on images captured from a first image sensor and a second image sensor, in accordance with some implementations. For example, blocks in the system 600 may be performed by the camera controller 140 or ISP 141 of device 100 of FIG. 1 and may be portions of an image processing pipeline. With respect to FIG. 6, first image data 610 may be received. For example, the first image data 610 may include chrominance and luminance data from a first image sensor. For example, the first image sensor may be an image sensor 111 shown in FIG. 1 and may include focus pixels configured to capture image data from at least two perspectives, a difference between the two perspectives associated with a first direction. In one example, the first image sensor may be a 2PD image sensor such as first image sensor 510 of FIG. 5. The first direction may be a horizontal direction, for example as shown in photodiodes 515L and 515R of focus pixel 515 of the first image sensor 510. The first image data 610 received from the first image sensor may include data such as chrominance and luminance data for each of the two phase images captured by the first image sensor.

Second image data 620 may also be received. For example, the second image data 620 may include chrominance and luminance data from a second image sensor. For example, the second image sensor may be an image sensor 112 of FIG. 1 or second image sensor 520 of FIG. 5. As discussed above, the second image sensor may be separated from the first image sensor in a direction orthogonal to the first direction. The second image data 620 received from the second image sensor may include image data such as chrominance and luminance data. If the second image sensor also includes focus pixels configured to capture image data from at least two perspectives, the image data captured by the second image sensor may further include image data for each of the two phase images captured by the second image sensor.

The first image data 610 may then be processed by PD depth determination 630. PD depth determination 630 may determine a first depth map based on the disparities between the first phase image and second phase image captured by the first image sensor 610. If the second image sensor 620 also includes focus pixels configured to capture image data from at least two perspectives, then PD depth determination 630 may also determine a depth map based on disparities between the first phase image and second phase image captured by the second image sensor 620. As discussed above, determining the first depth map may include determining a SAD metric for each of a plurality of tiles of the first and second phase images, such that the SAD metric for a particular tile is based on a sum of absolute differences between pixels of the first phase image and corresponding pixels of the second phase images. Further, PD depth determination 630 may determine a confidence value associated with each pixel of the first depth map, as discussed above, such that the confidence value for a particular pixel corresponds to the confidence value for the minimum value of the SAD metric for the tile to which the pixel belongs. For example, the confidence value may be based on the distinctness of the minimum SAD value, such as a ratio between the average value of the SAD metric over a range of phase differences and the determined minimum value of the SAD metric.

The first image data 610 and the second image data 620 may also be processed by dual camera depth determination 640, which may determine a second depth map based on the disparities between pixels of the first image data 610 and corresponding pixels of the second image data 620. Determining the second depth map may include determining a SAD metric for each of a plurality of tiles of the first and second images, such that the SAD metric for a particular tile is based on a sum of absolute differences between pixels of the first image and corresponding pixels of the second image. Further, dual camera depth determination 640 may determine a confidence value associated with each pixel of the second depth map, as discussed above, such that the confidence value for a particular pixel corresponds to the confidence value for the minimum value of the SAD metric for the tile to which the pixel belongs. For example, the confidence value may be based on the distinctness of the minimum SAD value, such as a ratio between the average value of the SAD metric over a range of phase differences and the determined minimum value of the SAD metric Each of the depth maps determined by PD depth determination 630 and dual camera depth determination 640 may be further processed by hybrid depth processing 650, which may generate a hybrid depth map. More particularly, hybrid depth processing 650 may select depths from the depth map(s) from PD depth determination 630 (e.g., the first depth map or if the second image sensor 620 also includes focus pixels, then the first depth map and the second depth map) or from the depth map determined by dual camera depth determination 640 (e.g., the second depth map), for example using depth selection 651. The selected depths may then be blended into a hybrid depth map, for example using image blending 652.

In some implementations, depths may be selected based on the confidence. More particularly, as discussed above, each depth map determined by PD depth determination 630 (such as a depth map determined using the first image data 610, and if the second image sensor also includes focus pixels, optionally also a depth map determined from the second image data 620) and each depth map determined by dual camera depth determination 640 may be associated with a corresponding confidence map, which may also be provided to hybrid depth processing 650. Depths having the highest confidence value may then be selected for inclusion in the hybrid depth map. In some examples, depths may be selected on a per-pixel basis, such that for each pixel, a depth is chosen from among the depth maps provided from PD depth determination 630 and dual camera depth determination 640 based on which of the corresponding per-pixel confidence maps has a highest confidence value for that pixel. In some other implementations, selection of the depths may be on a per-tile basis, such that for all pixels in the tile, the depth is selected from among the depth maps based on which of the corresponding per-tile confidence maps has the highest confidence value for that tile.

In some other implementations, rather than merely selecting one of the depths for each pixel or tile, hybrid depth processing 650 may select a proportional contribution of each of the depths based on the measures of confidence. More particularly, depths having a high degree of confidence may be assigned more weight in the hybrid depth map as compared to depths having lower degrees of confidence. The depths may then be represented in the hybrid depth map in relative proportion to their assigned weights. Further, the weights may be normalized, such that the weights sum to unity (or 100%), with each weight selected to be a number between zero and unity-thus, each weight may represent a percentage contribution to the hybrid depth map. Thus, if the depth maps have similar confidence values at a given pixel or tile, then the given pixel or tile of the hybrid depth map may reflect similar contributions from each of the depth maps. In contrast, if one depth map has a lower confidence value at the given pixel or tile, then its contribution may be less.

After selecting the depths, or the depths and corresponding weights, the hybrid depth map may be generated. In some implementations, the hybrid depth map may include each of the selected depths. In some other implementations, the hybrid depth may be generated to include the depths according to their assigned weights, as discussed above. If the depths are determined on a per-tile basis, the selected tiles may be blended together to generate the hybrid depth map.

FIG. 6 shows depth maps to be generated as an intermediate step to determining the hybrid depth map—for example PD depth determination 630 and dual camera depth determination 640 each determine one or more depth maps, which hybrid depth processing 650 may then use for determining or generating the hybrid depth map. In some other implementations, the first image data 610 and the second image data 620 may be processed directly by a hybrid depth processor, which may generate a hybrid depth map without generating intermediate depth maps based on the image data. More particularly, the chrominance and luminance data may be provided corresponding to the images captured by each of the first image sensor 610 and the second image sensor 620, and the corresponding data from the focus pixels of the first image sensor 610 (and optionally also the second image sensor 620 if it also includes focus pixels) may be provided to the hybrid depth processing module. In some example implementations, the hybrid depth processing module may use machine learning approaches, such as neural networks, to generate the hybrid depth map. The hybrid depth processing module previously may have been trained using known techniques to optimize for such depth determination.

Further, while FIG. 6 shows both first image sensor 610 and second image sensor 620 to capture image data, and for depth maps to be generated using both PD depth determination 630 and dual camera depth determination 640, in some other implementations an example device may forego one or more image capture or depth map determination operations, for example based on a determined confidence map. For example, in one implementation, if each pixel or tile of a respective per-pixel or per-tile confidence map generated by PD depth determination 630 is greater than a threshold value, a determination may be made that hybrid depth processing is not required for determining a sufficiently accurate depth map. If each pixel or tile is above the threshold for such a first depth map determined by PD depth determination 630, then the example device may forego one or more of capturing the second image using the second image sensor, receiving the second image data 620, determining a depth map for the second image using PD depth determination 630, or determining the second depth map using dual camera depth determination 640.

Further, in another implementation, if each pixel or tile of a respective per-pixel or per-tile confidence map is not greater than the threshold value, a determination may be made that hybrid depth processing is required for determining a sufficiently accurate depth map. If each pixel or tile is not above the threshold for such a first depth map determined by PD depth determination 630, then the example device may receive the second image data 620, optionally determine a depth map for the second image using PD depth determination 630, determine the second depth map using dual camera depth determination 640, and generate the hybrid depth map using hybrid depth processing 650.

Figure 7:
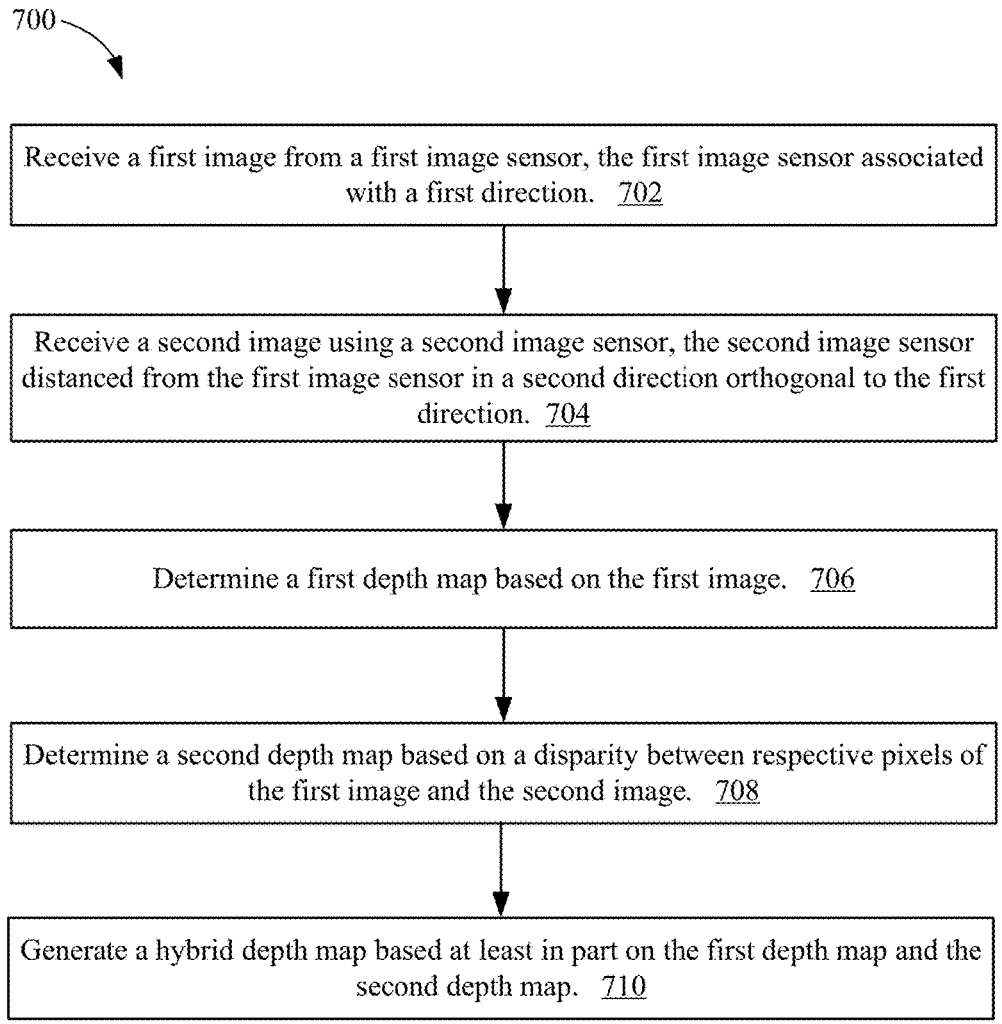
FIG. 7 is an illustrative flow chart depicting an example operation for hybrid depth map processing, according to some example implementations.

FIG. 7 is an illustrative flow chart depicting an example operation 700 for hybrid depth map processing, according to the example implementations. The example operation 700 may be performed using any suitable image processing device, such as device 100, or using a suitable image processing system such as system 600. However, other devices or systems may be used, and the present disclosure should not be limited by the examples or the description of implementation using the image processing device 100 or system 600.

With respect to FIG. 7, a device 100 may receive a first image from a first image sensor, the first image sensor associated with a first direction (702). For example, the first image may be captured by a suitable image sensor, such as image sensor 111 of FIG. 1, or first image sensor 510 of FIG. 5, which may include a plurality of focus pixels, where the focus pixels are configured to capture image data from at least a first perspective and a second perspective, such that a difference between the first perspective and the second perspective is associated with the first direction. In one example the first image sensor may be a dual photodiode (2PD) image sensor having a first number of 2PD pixels, each of which are determined using two photodiodes, where two photodiodes of each 2PD pixel are adjacent in the first direction. For example, the first direction may be a horizontal direction, such that the two perspectives include a left perspective and a right perspective.

The device 100 may also receive a second image using a second image sensor, where the second image sensor is separated from the first image sensor in a second direction orthogonal to the first direction (704). The second image may be captured by a suitable image sensor such as image sensor 112 of FIG. 1, or second image sensor 520 of FIG. 5. The second image sensor may also include a plurality of focus pixels, such that a difference between the first perspective and the second perspective is associated with the first direction. In some implementations, the second direction may be a vertical direction, such that the second image sensor is located above or below the first image sensor.

The device 100 may determine a first depth map based on the first image (706). For example, the device 100 may determine the first depth map using ISP 141 or by executing instructions from memory such as instructions 131 from memory 130. Further, the first depth map may be determined using PD depth determination 630 of FIG. 6. The first depth map may be determined based at least in part on the focus pixels of the first image sensor. For example, the first depth map may be based on a disparity between a respective first phase image and second phase image captured using data from the respective first perspective and second perspective. In some aspects determining the first depth map may also include determining a first confidence map corresponding to the first depth map. The first confidence map may be based at least in part on a first sum of absolute differences (SAD) metric for the first image. Further, the first confidence map may be a per-tile confidence map or a per-pixel confidence map.

The device 100 may then determine a second depth map based on a disparity between respective pixels of the first image and the second image (708). For example, the device 100 may determine the second depth map using ISP 141 or by executing instructions from memory, such as instructions 131 from memory 130. Further, the second depth map may be determined using dual camera depth determination 640 of FIG. 6. In some aspects determining the first depth map may also include determining a second confidence map corresponding to the first depth map. The second confidence map may be based at least in part on a second sum of absolute differences (SAD) metric for the second image. Further, the second confidence map may be a per-tile confidence map or a per-pixel confidence map.

The device 100 may then generate a hybrid depth map based at least in part on the first depth map and the second depth map (710). For example, the device 100 may generate the hybrid depth map using ISP 141, or by executing instructions from memory, such as instructions 131 from memory 130. Further, the hybrid depth map may be determined using hybrid depth processing 650 of FIG. 6. In some aspects, the depths of the hybrid depth map may be generated based at least in part on a comparison of pixels of the first confidence map and corresponding pixels of the second confidence map. Generating the hybrid depth map may further include selecting, as each pixel of the hybrid depth map, either a corresponding pixel of the first depth map or a corresponding pixel of the second depth map, the selected pixel having a higher confidence value.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 130 in the example image processing device 100 of FIG. 1) comprising instructions that, when executed by the processor 120 (or the graphics processor 121), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 120 or the graphics processor 121 in the example image processing device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the image processing device 100, the processor 120, and/or the graphics processor 121, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device, comprising:
   a first image sensor including a plurality of focus pixels, the focus pixels configured to capture images from at least a first perspective and a second perspective, a difference between the first and second perspectives associated with a first direction;
   a second image sensor separated from the first image sensor in a second direction orthogonal to the first direction;
   a memory; and
   a processor coupled to the memory and configured to:
      receive a first image from the first image sensor, the first image comprising first image data captured from the first perspective and second image data captured from the second perspective;
      receive a second image from the second image sensor; and
      generate a hybrid depth map based at least in part on the first image and the second image.

2. The device of claim 1, wherein the processor is configured to generate the hybrid depth map using a neural network, the neural network trained to receive image data from the first and second images and to generate the hybrid depth map.

3. The device of claim 1, wherein the processor is configured to generate the hybrid depth map by:
   determining a first depth map based on a first disparity between the first image data captured from the first perspective and the second image data captured from the second perspective;
   determining a second depth map based on a second disparity between respective pixels of the first image and the second image; and
   generating a hybrid depth map based at least in part on the first depth map and the second depth map.

4. The device of claim 3, wherein the processor is further configured to:
   determine a first confidence map corresponding to the first depth map; and
   determine a second confidence map corresponding to the second depth map;
   wherein the hybrid depth map is generated based at least in part on the first confidence map and the second confidence map.

5. The device of claim 4, wherein depths of the hybrid depth map are determined based at least in part on a comparison of pixels of the first confidence map and corresponding pixels of the second confidence map.

6. The device of claim 4, wherein the first confidence map is based at least in part on a first sum of absolute differences (SAD) metric for the first image, and wherein the second depth map is based at least in part on a second SAD metric, the second SAD metric based on differences between corresponding pixels of the first image and the second image.

7. The device of claim 4, wherein the processor is further configured to generate the hybrid depth map by selecting, as each pixel of the hybrid depth map, either a corresponding pixel of the first depth map or a corresponding pixel of the second depth map, the selected pixel having a higher confidence value.

8. The device of claim 1, wherein the first image sensor is a dual photodiode (2PD) image sensor, each focus pixel of the first image sensor including a first photodiode and a second photodiode, the first and second photodiodes adjacent in the first direction.

9. The device of claim 8, wherein the first direction is a horizontal direction and the second direction is a vertical direction.

10. The device of claim 1, wherein the second image sensor is a 2PD sensor, each focus pixel of the second image sensor including a third photodiode and a fourth photodiode, the third and fourth photodiodes adjacent in the first direction.

11. A method for hybrid depth map processing, the method comprising:
    receiving a first image from a first image sensor, the first image sensor associated with a first direction;
    receiving a second image from a second image sensor, the second image sensor separated from the first image sensor in a second direction orthogonal to the first direction;
    determining a first depth map based on the first image;
    determining a second depth map based on a disparity between respective pixels of the first image and the second image; and
    generating a hybrid depth map based at least in part on the first depth map and the second depth map.

12. The method of claim 11, wherein the second direction is a vertical direction, and the first direction is a horizontal direction.

13. The method of claim 11, wherein the first image sensor includes a plurality of focus pixels, the focus pixels configured to capture images from at least a first perspective and a second perspective, a difference between the first and second perspectives associated with the first direction.

14. The method of claim 13, wherein the first image sensor is a dual photodiode (2PD) image sensor, and the focus pixels comprise 2PD pixels which are each determined using two photodiodes adjacent in the first direction.

15. The method of claim 13, wherein determining the first depth map comprises determining the first depth map based at least in part on first image data captured from the first perspective and second image data captured from the second perspective.

16. The method of claim 15, wherein:
    determining the first depth map further comprises determining a first confidence map corresponding to the first depth map;
    determining the second depth map further comprises determining a second confidence map corresponding to the second depth map; and
    the hybrid depth map is generated based at least in part on the first confidence map and the second confidence map.

17. The method of claim 16, wherein depths of the hybrid depth map are generated based at least in part on a comparison of pixels of the first confidence map and corresponding pixels of the second confidence map.

18. The method of claim 16, wherein the first confidence map is based at least in part on a first sum of absolute differences (SAD) metric for the first image data and the second image data, and the second confidence map is based at least in part on a second SAD metric, the second SAD metric based on differences between corresponding pixels of the first image and the second image.

19. The method of claim 16, wherein generating the hybrid depth map comprises selecting, as each pixel of the hybrid depth map, either a corresponding pixel of the first depth map or a corresponding pixel of the second depth map, the selected pixel having a higher confidence value.

20. A non-transitory, computer-readable storage medium storing instructions that, when executed by one or more processors of an image processing device, cause the image processing device to:
- receive a first image from a first image sensor, the first image sensor associated with a first direction;
- receive a second image from a second image sensor, the second image sensor separated from the first image sensor in a second direction orthogonal to the first direction;
- determine a first depth map based on the first image;
- determine a second depth map based on a disparity between respective pixels of the first image and the second image; and
- generate a hybrid depth map based at least in part on the first depth map and the second depth map.

21. The non-transitory, computer-readable storage medium of claim 20, wherein the second direction is a vertical direction, and the first direction is a horizontal direction.

22. The non-transitory, computer-readable storage medium of claim 20, wherein the first image sensor includes a plurality of focus pixels, the focus pixels configured to capture images from at least a first perspective and a second perspective, a difference between the first and second perspectives associated with the first direction.

23. The non-transitory, computer-readable storage medium of claim 22, wherein the first image sensor is a dual photodiode (2PD) image sensor, and the focus pixels comprise 2PD pixels which are each determined using two photodiodes adjacent in the first direction.

24. The non-transitory, computer-readable storage medium of claim 22, wherein execution of the instructions to determine the first depth map further causes the image processing device to determine the first depth map based at least in part on first image data captured from the first perspective and second image data captured from the second perspective.

25. The non-transitory, computer-readable storage medium of claim 24, wherein:
- execution of the instructions to determine the first depth map further causes the image processing device to determine a first confidence map corresponding to the first depth map;
- execution of the instructions to determine the second depth map further causes the image processing device to determine a second confidence map corresponding to the second depth map; and
- execution of the instructions to generate the hybrid depth map further causes the image processing device to generate the hybrid depth map based at least in part on the first confidence map and the second confidence map.

26. The non-transitory, computer-readable storage medium of claim 25, wherein depths of the hybrid depth map are generated based at least in part on a comparison of pixels of the first depth map and corresponding pixels of the second depth map.

27. The non-transitory, computer-readable storage medium of claim 25, wherein the first confidence map is based at least in part on a first sum of absolute differences (SAD) metric for the first image, and wherein the second depth map is based at least in part on a second SAD metric, the second SAD metric based on differences between corresponding pixels of the first image and the second image.

28. The non-transitory, computer-readable storage medium of claim 25, wherein execution of the instructions to generate the hybrid depth map further cause the image processing device to select, as each pixel of the hybrid depth map, either a corresponding pixel of the first depth map or a corresponding pixel of the second depth map, the selected pixel having a higher confidence value.

29. An image processing device, comprising:
- means for receiving a first image from a first image sensor, the first image sensor associated with a first direction;
- means for receiving a second image from a second image sensor, the second image sensor separated from the first image sensor in a second direction orthogonal to the first direction;
- means for determining a first depth map based on the first image;
- means for determining a second depth map based on a disparity between respective pixels of the first image and the second image; and
- means for generating a hybrid depth map based at least in part on the first depth map and the second depth map.

30. The image processing device of claim 29, wherein the first image sensor includes a plurality of focus pixels, the focus pixels configured to capture images from at least a first perspective and a second perspective, a difference between the first and second perspectives associated with the first direction.

* * * * *